United States Patent
Guertin et al.

(10) Patent No.: US 9,352,996 B2
(45) Date of Patent: May 31, 2016

(54) OPTICAL FIBER ARTICLE FOR HANDLING HIGHER POWER AND METHOD OF FABRICATING OR USING

(71) Applicant: Nufern, East Granby, CT (US)

(72) Inventors: Douglas Guertin, Monson, MA (US); Nils Jacobson, Windsor, CT (US); Kanishka Tankala, South Windsor, CT (US); Adrian Carter, Bulli (AU)

(73) Assignee: Nufern, East Granby, CT (US)

( * ) Notice: Subject to any disclaimer, the term of this patent is extended or adjusted under 35 U.S.C. 154(b) by 168 days.

(21) Appl. No.: 13/935,077

(22) Filed: Jul. 3, 2013

(65) Prior Publication Data

US 2013/0291603 A1    Nov. 7, 2013

Related U.S. Application Data

(63) Continuation of application No. 12/562,749, filed on Sep. 18, 2009, now abandoned, which is a continuation-in-part of application No. PCT/US2008/057950, filed on Mar. 21, 2008.

(60) Provisional application No. 60/896,263, filed on Mar. 21, 2007.

(51) Int. Cl.
| C03B 37/012 | (2006.01) |
| C03B 37/027 | (2006.01) |
| G02B 6/02 | (2006.01) |
| H01S 3/067 | (2006.01) |

(52) U.S. Cl.
CPC ..... *C03B 37/01222* (2013.01); *C03B 37/01228* (2013.01); *C03B 37/01231* (2013.01); *C03B 37/02763* (2013.01); *G02B 6/02042* (2013.01); *H01S 3/06704* (2013.01); *C03B 2203/18* (2013.01); *C03B 2203/20* (2013.01); *C03B 2203/32* (2013.01); *C03B 2203/34* (2013.01); *C03B 2205/06* (2013.01); *C03B 2205/07* (2013.01); *H01S 3/06708* (2013.01)

(58) Field of Classification Search
None
See application file for complete search history.

(56) References Cited

U.S. PATENT DOCUMENTS

| 4,315,666 A | 2/1982 | Hicks, Jr. |
| 4,630,889 A | 12/1986 | Hicks, Jr. |

(Continued)

OTHER PUBLICATIONS

International Search Report for International Patent Application No. PCT/US2008/057950.

(Continued)

*Primary Examiner* — Lisa Herring
(74) *Attorney, Agent, or Firm* — McDonnell Boehnen Hulbert & Berghoff LLP

(57) ABSTRACT

An optical fiber preform, and method for fabricating, having a first core, a second core spaced from the first core and first and second regions, the first region having an outer perimeter having a first substantially straight length and the second region having an outer perimeter having a second substantially straight length facing the first straight length. One of the regions can comprise the first core and the other comprises the second core. The preform can be drawn with rotation to provide a fiber wherein a first core of the fiber is multimode at a selected wavelength of operation and a second core of the fiber is spaced from and winds around the first core and has a selected longitudinal pitch. The second core of the fiber can couple to a higher order mode of the first core and increase the attenuation thereof relative to the fundamental mode of the first core.

18 Claims, 9 Drawing Sheets

(56) References Cited

U.S. PATENT DOCUMENTS

| | | | |
|---|---|---|---|
| 5,533,163 A | 7/1996 | Muendel | |
| 5,864,645 A | 1/1999 | Zellmer et al. | |
| 6,115,526 A * | 9/2000 | Morse | 385/125 |
| 6,826,335 B1 | 11/2004 | Grudinin et al. | |
| 6,959,131 B2 | 10/2005 | Willig | |
| 7,110,647 B2 | 9/2006 | Farroni et al. | |
| 7,813,608 B2 | 10/2010 | Tammela et al. | |
| 2002/0114602 A1 * | 8/2002 | Tardy et al. | 385/123 |
| 2003/0164006 A1 | 9/2003 | Buchanan et al. | |
| 2004/0050110 A1 | 3/2004 | Berkey et al. | |
| 2006/0024008 A1 * | 2/2006 | Galvanauskas | 385/123 |
| 2006/0213230 A1 * | 9/2006 | Miyabe et al. | 65/409 |

OTHER PUBLICATIONS

Cambridge Dictionary (http://dictionary.cambridge.org/dictionary/american-english/fuse_3), 2013.

* cited by examiner

OPTICAL FIBER ARTICLE FOR HANDLING HIGHER POWER AND METHOD OF FABRICATING OR USING

CROSS-REFERENCE TO RELATED APPLICATIONS

This application is a continuation of U.S. patent application Ser. No. 12/562,749, which is a continuation-in-part of International Application No. PCT/US2008/057950, filed Mar. 21, 2008, which in turn claims priority to U.S. Provisional Patent Application No. 60/896,263, filed Mar. 21, 2007. Each of the foregoing applications is hereby incorporated herein by reference in its entirety.

TECHNICAL FIELD

The present invention relates to fiber optic articles, such as optical fibers, optical fiber preforms and the like, and methods for making and using fiber optic articles.

BACKGROUND ART

Fiber lasers and fiber amplifiers capable of handling higher powers are of considerable interest. Unfortunately, non-linear effects, such as Simulated Brillioun Scattering (SBS) and Stimulated Raman Scattering (SRS) can limit the power output of fiber lasers and amplifiers to lower powers. Because optical fiber has a rather small cross section, the light propagated by the fiber is rather concentrated and hence, at higher power operation, the light can reach a power density that exceeds the power density threshold for the onset of SBS and/or SRS.

Fibers having a larger diameter core can lower the power density and delay the onset of SBS or SRS, thereby allowing higher power operation. However, a core having a larger diameter is not typically single mode. Because the larger diameter core will support modes in addition to the fundamental mode, the fiber provides a lower beam quality (i.e., a lower $M^2$ factor) than a single mode fiber. Higher beam quality is important in many applications. Certain techniques are known for attenuating and/or limiting the excitation of such higher order modes such that a larger core fiber can still provide good beam quality.

Known techniques include coiling of the fiber to selectively induce bend loss into the higher order modes, such as is taught in U.S. Pat. No. 6,496,301, entitled "Helical Fiber Amplifier". US 2006/0024008 A1, entitled "Composite Waveguide", teaches another technique. With reference to FIG. 1, the '008 application teaches an optical fiber 100 having a first, centrally located and large diameter core 122 for propagating power and a side core 124 spaced from (such as by distance d) and in optical proximity of the central core 122. The side core 124 winds around the central core 122 and couples to higher order modes of the central core 122. The higher order modes are attenuated due to the bend loss induced by the winding of the side core 124. An optical cladding (not shown in FIG. 1) surrounds the cores 122 and 124 and occupies the space between them. The winding can be characterized by a pitch P. Typically the cladding comprises a material having a lower index of refraction than an index of refraction of material comprised by a core.

The '008 publication discloses a method of manufacture of such an optical fiber comprising drawing while rotating a fiber preform having a central core and an off-center side core. With reference to FIG. 2, the '008 publication is understood to teach that an initial preform 200 having a single central core 222 is drilled to form a hole 220 for insertion of a side core 224. The side core 224 can be selected from pre-manufactured glass rods having a predetermined dopant composition. The preform having the side core 224 inserted in the hole 220 is then heated to collapse any air gaps. The preform having the side core can be drawn to a fiber while rotating the preform about an axis passing through the central core 222 such that in the resultant drawn fiber the side core winds about the central core, as shown in FIG. 1.

While the foregoing applications, patents or techniques may represent an improvement in the art, each can have drawbacks or limitations in certain circumstances. Accordingly, it is an object of the present invention to provide optical articles and methods for fabricating or using such optical articles that address one or more of the drawbacks or deficiencies of the prior art.

SUMMARY

In certain instances, desirable operation of the fiber shown in FIG. 1 can require a very small spacing d between the side core 124 and the central core 122, and hence a very small spacing S between the core 222 and drilled hole 220 of FIG. 2 if a preform is to be made as taught in the '008 published application. A very small spacing S can be problematic, as the central core 222 can be damaged during drilling, or the preform otherwise rendered unusable. For example, due to the stresses (because the material of the core is typically different than that of the cladding material, formed by the initial tube), drilling close to the core can cause crack propagation or shattering, rendering the preform less desirable or undesirable for use. Yield, an important consideration in a commercial endeavor, can be reduced unacceptably.

Accordingly, Applicants teach herein preforms and methods of making and using such preforms to make fiber that can reduce the number of holes to be drilled to receive side cores or that can avoid altogether the need for drilling a hole to receive a side core. In addressing the difficulty of drilling a hole close to the core, Applicants discovered that the practical restrictions on shaping, such as machining, a preform to within a certain distance of a core to be less onerous.

In one aspect, the invention provides an optical fiber preform extending in a longitudinal direction for drawing an optical fiber therefrom having a first core winding about a second core. The optical fiber preform can comprise a first core; a second core spaced from the first core; and first and second regions, the first region when viewed in cross section having an outer perimeter having a first curved length and a first substantially straight length and the second region having an outer perimeter having a second substantially straight length facing the first straight length. One of the first and second regions can comprise the first core and the other of the first and second regions can comprise the second core. The first and second regions can each include a cladding disposed about and contiguous with the first and second cores, respectively. "Disposed about", as used herein, means that a region, surrounds, at least partially, another region, and may additionally contact or be contiguous with the other layer or cladding, if there are no intermediate regions interposed between the region and other region.

The preform can be constructed and arranged such that the preform can be drawn with rotation about an axis passing through the first core to provide the fiber wherein a first core of the fiber is multimode at a selected wavelength of operation and a second core of the fiber is spaced from and winds around the first core of the fiber and has a selected longitudinal pitch and wherein at the wavelength of operation the second core of the fiber couples to a higher order mode of the first core of the fiber and increases the attenuation thereof relative to the fundamental mode of the first core of the fiber. It is noted that, as used herein, the term "cross section" means cross section taken perpendicular to the longitudinal or elongate direction.

The optical fiber preform can comprise an outer perimeter bounding the cross section of the optical fiber preform and defining the geometrical center of the preform. The first core can comprise a cross sectional area within which the geometrical center lies. The first and second substantially straight lengths can be one or more of spaced apart, contiguous, substantially parallel, or coextensive at least along a portion of one of the substantially straight lengths. In certain practices of the invention, outer perimeter of the second region comprises only substantially straight lengths. The outer perimeter of the second region can include a second curved length. The first curved length can be characterized by a first radius of curvature and the second curved length is characterized by a second radius of curvature that is different than the first radius of curvature. The first and second radii of curvature can have different lengths. The first radius of curvature can originate within the cross sectional area of the first core and the second radius of curvature can originate from within the cross sectional area of the second core. The first and second radii of curvature can have different lengths.

The first and second regions can be fused together. The optical fiber preform can comprise a third region comprising a D-shaped outer perimeter, as well as a fourth region comprising a D-shaped outer perimeter. The optical fiber preform can comprise a region, such as the cross section of a tube, having an inner perimeter disposed about the first and second regions. The optical fiber preform can be further constructed and arranged such that the preform can be drawn to the fiber wherein the first core of the fiber has a numerical aperture of less than or equal to 0.09. The optical fiber preform can be further constructed and arranged such that the preform can be drawn to the fiber wherein the second core of the fiber has a numerical aperture of less than or equal to 0.09.

In another aspect, the invention can provide an optical fiber preform extending in a longitudinal direction for drawing an optical fiber therefrom having a first core and a second core winding about the first core, where the preform can comprise a unitary core rod comprising a first core and a cladding disposed about the core; an arrangement of elongate members forming a ring disposed about the core rod; a second core comprising at least one of the elongate members of the arrangement forming the ring; and an elongate tubular region (e.g., a commercially available substrate tube) disposed about the arrangement of elongate members. The preform can be constructed and arranged such that the preform can be drawn with rotation about an axis passing through the first core to provide the fiber wherein a first core of the fiber is multimode at a selected wavelength of operation and a second core of the fiber is spaced from and winds around the first core of the fiber and has a selected longitudinal pitch and wherein at the wavelength of operation the second core of the fiber can couple to a higher order mode of the first core of the fiber and increases the attenuation thereof relative to the fundamental mode of the first core of the fiber.

The optical fiber preform can comprise an outer perimeter bounding the cross section of the optical fiber preform and defining the geometrical center of the preform. The first core can comprise a cross sectional area within which the geometrical center lies. In one practice of the invention the core rod can comprise a diameter and the thickness of the cladding of the core rod is no greater than 15% of the diameter of the core rod. At least some of the elongate members of the arrangement of elongate members can be solid rods. The cladding of the core rod can be substantially solid. The optical fiber preform can comprise another elongate tubular region interposed between the arrangement of elongate members and the core rod. The optical fiber preform can comprise another region (e.g., the cross section of a tube) disposed about the arrangement of elongate members. The optical fiber preform can comprise a third core comprising a different one of the elongate members than the side core.

The present invention also involves methods. For example, in one aspect, there is provided a method of fabricating an optical fiber preform extending in a longitudinal direction for drawing an optical fiber therefrom having a first core and a second core winding about the first core. The method can comprise providing a first elongate member having when viewed in cross section an outer perimeter having a first substantially straight length, the first elongate member further including a core within the outer perimeter of the first elongate member; providing a second elongate member having when viewed in cross section an outer perimeter having a second substantially straight length and a second core within the outer perimeter of the second elongate member; and arranging the preform such that the first substantially straight length faces the second substantially straight length. The preform can be further constructed and arranged such that the preform can be drawn with rotation about a longitudinal axis passing through the first core to provide the fiber wherein the first core of the fiber is multimode at a selected wavelength of operation and the second core of the fiber is spaced from and winds around the first core of the fiber and has a selected longitudinal pitch and wherein at the wavelength of operation the second core of the fiber couples to a higher order mode of the first core of the fiber and increases the attenuation thereof relative to the fundamental mode of the first core of the fiber.

The preform can be arranged such that the outer perimeter of the cross section of the preform defines a geometrical center and the geometrical center lies within the cross sectional area of the first core, or such that first and second substantially straight lengths are one or more of spaced apart, substantially parallel, or contiguous. The first and second elongate members can be fused together. A tubular region can be disposed about the first and second elongate members.

The outer perimeter of the first region can include a first curved length. The outer perimeter of the second region can include a second curved length. The first curved length can be characterized by a first radius of curvature and the second curved length can be characterized by a second radius of curvature, where the first and second radii of curvature are different. The first radius of curvature can originate, or extend, from within the cross sectional area of the first core and the second radius of curvature can originate from within the cross sectional area of the second core. The first and second radii can be of different lengths. The first elongate member can at one point have when viewed in cross section a substantially circular outer perimeter and the method can include shaping the first elongate member to form the first straight length. The substantially circular outer perimeter can define a geometrical center lying within the cross sectional area of the first core and the method can include shaping such that the outer perimeter defines a new geometrical center that lies outside of the cross sectional area of the first core. The second member can at one point have when viewed in cross section a substantially circular outer perimeter that defines a geometrical center that lies within the cross sectional area of the second core and the method can include shaping the second elongate member such that the outer perimeter defines a new geometrical center that lies outside the cross sectional area of the second core.

Many processes that are advantageous in fabricating preforms include depositing material in an axially symmetric manner on a substrate, such as a substrate tube or rod. As one example, in the Modified Chemical Vapor Deposition (MCVD) process, material is deposited on the inside of a rotating tube that can then be collapsed to form a solid rod. Material deposited on the inside of the tube typically forms all or part of a centrally located core in the solid rod that results from collapsing the tube. Similar considerations apply, for example, to the Outside Vapor Deposition (OVD) process, which can also result in a rod having a central region comprising deposited material surrounded by material of the tube.

Providing at least one of the first and second elongate members can comprise an axially symmetric deposition process wherein material to form the core of the at least one member is deposited on a cylindrical substrate. Providing the other of the first and second elongate members can comprise an axially symmetric deposition process wherein material for forming the core of the other elongate member is deposited on a different cylindrical substrate. The method can comprise fusing the first elongate member with the second elongate member. The preform can be drawn to form the fiber while rotating one of the fiber and the preform. Rotating one of the fiber and the preform can comprise rotating the preform.

As noted above, the preform can be constructed and arranged to provide a fiber having certain properties. One of ordinary skill in the art understands that a preform is in certain aspects a scale model of the fiber to be drawn and hence is designed accordingly. Therefore, given the disclosure herein, it is considered that one of ordinary skill in the art can construct and arrange a preform according to the invention so as to provide fibers as described herein. In one practice of the invention, a preform is constructed and arranged so as to provide a fiber having a first core having a diameter of approximately 35 microns and a numerical aperture (NA) relative to its cladding of approximately 0.07. The spacing d can comprise approximately 2 microns and the side core can have a diameter of approximately 12 microns and a NA of approximately 0.09 relative to the cladding. The pitch P can comprise about 6.2 mm.

For such a fiber, the attenuation for at least one higher order mode (e.g., $LP_{11}$) is understood to be 10-100 dB/meter greater than the attenuation of the fundamental mode $LP_{01}$ at (or for wavelengths greater than) a selected wavelength of operation, such as, for example, 1550 nanometers. The attenuation of several higher order modes (e.g., $LP_{11}$, $LP_{21}$, $LP_{02}$), or even of all higher order modes, can be 10 to 100 dB/meter higher than the attenuation of the fundamental mode at a selected wavelength of operation. The loss of the fundamental mode, at, for example, the same wavelength of operation, can be less than 1 dB/meter, or can be less than 0.5 dB/meter or can even be less than 0.4 dB/meter.

The first core of the fiber is usually multimode at the wavelength of operation. The first core can have a V-number of greater than 2.405 at the wavelength of operation (multimode and V-number in this context meaning as considered as if the side core or cores were absent, as the side core or cores in practice can make the fiber act as substantially single moded (in the fundamental mode) or as a fiber having a V-number less than 2.405). The first core can have a diameter of greater than or equal to 10 microns, greater than or equal to 12 microns, or greater than or equal to 15 microns. The primary or the side core can have a NA of less than or equal to 0.12, a NA of less than or equal to 0.10, or a NA less than or equal to 0.08.

In certain practices of the invention, the pitch with which the side core is wound can be less than or equal to 20 mm, less than or equal to 15 mm, less than or equal to 10 mm, less than or equal to 8 mm, or less than or equal to 5 mm. The pitch can vary along the length of the fiber. One way to accomplish varying the pitch is to change the rate of rotation of the preform and/or the fiber as the fiber is being drawn from the preform. In certain practices of the invention, the variation in pitch (i.e., the difference between the maximum and minimum pitches) can be less than or equal to 0.5 mm, less than or equal to 1 mm, less than or equal to 2 mm, or less than or equal to 5 mm. In other practices, the variation in pitch can be between (i.e., range from) 0.5 mm and 1 mm, can be between 1 mm and 2 mm, or can be between 2 mm and 3 mm. Pitch can be a function of the speed with which the fiber is drawn and the rotation rate used during draw.

Further advantages, novel features, and objects of the invention will become apparent from the following detailed description of non-limiting embodiments of the invention when considered in conjunction with the accompanying FIGURES, which are schematic and which are not drawn to scale. For purposes of clarity, not every component is labeled in every one of the following FIGURES, nor is every component of each embodiment of the invention shown where illustration is not considered necessary to allow those of ordinary skill in the art to understand the invention.

DETAILED DESCRIPTION OF THE PREFERRED EMBODIMENTS

Figure 1:
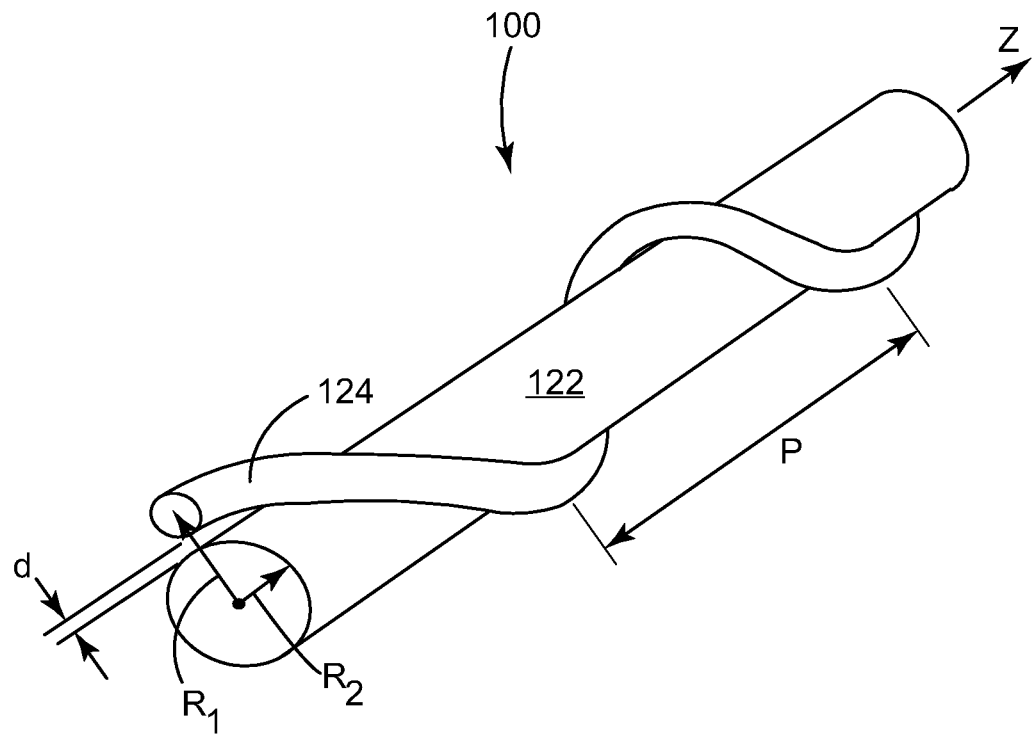
FIG. 1 schematically illustrates a prior art optical fiber having a central core and a side core winding about the central core.
Figure 3:
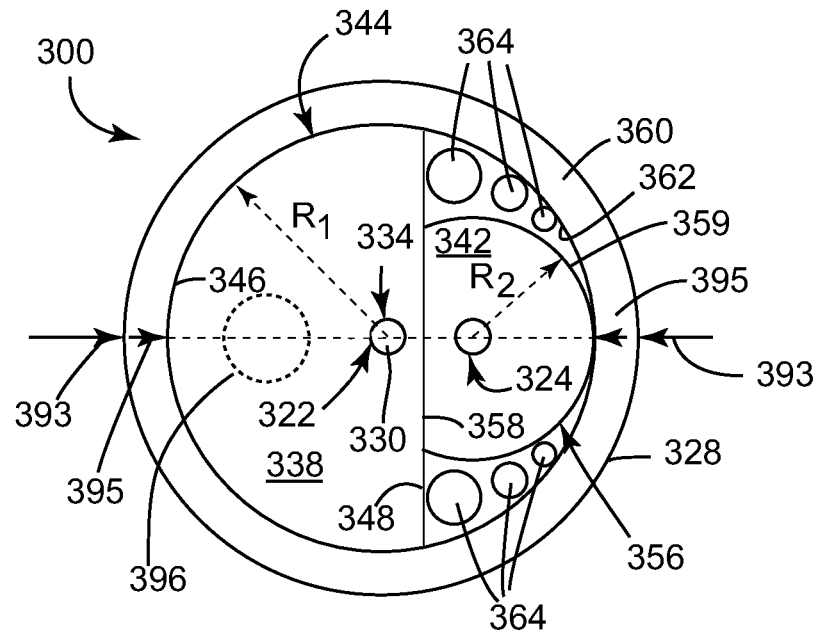
FIG. 3 is a cross section of one embodiment of an optical fiber preform.

FIG. 3 is a cross section of one embodiment of an optical fiber preform 300 according to the invention, where the cross section is taken perpendicular to a longitudinal axis along which the preform extends. The optical fiber preform 300 is formed and then drawn in the process of fabricating an optical fiber, such as the optical fiber 100 of FIG. 1, having a first core 122 as well as a side core 124 that winds about the first core 122. Accordingly, the optical fiber preform 300 comprises a first core 322 and a second core 324. The first and second cores 322 and 324 can form, respectively, the first and side cores 122 and 124 of the optical fiber 100.

The preform 300 can comprise an outer perimeter 328 bounding the cross section of the optical fiber preform 300 and defining the geometrical center of the preform 300. The geometrical center 330 of the outer perimeter 328 is the location determined by the average x coordinate and the average y coordinate of the set of x and y coordinates that describes the perimeter 328 in the cross sectional plane. (For a perfect circle, the geometrical center is what is normally referred to as the center of the circle). Typically, the first core 322 comprises a cross sectional area (defined by the outer perimeter 334 of the first core 322) within which the geometrical center 330 lies. Preferably, the outer perimeter 328 is substantially circular in shape.

The preform 300 can also comprise first and second regions, 338 and 342, respectively. The first region 338 can include an outer perimeter 344 having a first curved length 346 and a first substantially straight length 348. The second region 342 can have an outer perimeter 356 having a second substantially straight length 358 facing the first substantially straight length 348. The first substantially straight length 348 can be substantially parallel to the second substantially straight length 358. The first substantially straight length 348 can be spaced from the second substantially straight length 358. In the embodiment shown in FIG. 3, the substantially straight lengths are substantially parallel and the second substantially straight length 358 is shown as coextensive with at least part of the first substantially straight length 348. The first substantially straight length 348 and the second substantially straight length 358 are contiguous in the embodiment shown in FIG. 3. The outer perimeter 356 of the second region 342 can include the curved length 359, which can be referred to as the second curved length to distinguish it from the first curved length 346 of the first region 338.

The preform 300 can include a second core 324 spaced from the first core 322, (where, as is evident to one of ordinary skill in light of the disclosure herein, the spacing between the cores refers to the edge-to-edge distance between the outer perimeters thereof along a diameter passing through the geometric centers of each of the outer perimeters). One of the first and second regions 338 and 342 can comprise the second core 324. In the embodiment shown in FIG. 3, the second region 342 comprises the second core 324. The preform 300 can be constructed and arranged such that the preform 300 can be drawn with rotation (See FIG. 7 and accompanying description) to a fiber, such as the fiber 100 of FIG. 1, wherein the central core 122 is multimode at a selected wavelength of operation and the side core 124 is wound about and spaced from the central core 122 and has a selected longitudinal pitch P and such that at the wavelength of operation the side core 124 couples to a higher order mode of the central core 122 and selectively increases the attenuation thereof relative to the fundamental mode of the central core 122.

The first curved length 346 of the first region 338 can be characterized by (i.e., substantially conform to) a first radius of curvature $R_1$. The second curved length 359 of the second region 342 can be characterized by a radius $R_2$. $R_1$ and $R_2$ are typically different in that they can originate from different points and/or can have different lengths. Typically they both originate from different points and have different lengths. $R_1$ typically originates from within the cross sectional area of the first core and $R_2$ originates from within the cross sectional area of the second core. $R_1$ typically has a greater length than $R_2$.

The preform 300 can include an outer region 360, which can be annular as shown in FIG. 3 and which can be a tube, disposed about the first region 338 and the second region 342. The tube can have the inner perimeter 362 and the outer perimeter of the tube can be the outer perimeter 328 of the preform 300. The inner perimeter can be contiguous with at least part of the curved lengths 346 and 359. The outer region 360 (as well as the first and second regions, except typically for the cores thereof) can comprise, consist essentially of, or consist of, for example, glass, such as silica glass. As noted elsewhere herein, many techniques are suitable for fabricating all or parts of a preform according to the invention. A vapor deposition process, such as the Outside Vapor Deposition process, described elsewhere herein, can be used in forming all or part of the preform 300, including fabricating the outer region 360. For example, glass soot comprising a suitable index of refraction (e.g., lower than an index of refraction of the material of the first and second regions, 338 and 342, disposed about the cores of those regions), can be deposited over the first and second regions 338 and 342. The soot is then consolidated to form a clear glass. The preform 300 can comprise glass tubes or rods, selected ones of which are designated by reference numeral 364. The tubes or rods can be sized (e.g., have diameter selected) to fill the gaps between the inner perimeter 362 of the tube 360 and the curved length 359 of the perimeter 356 of the second region 342 to help prevent voids or inclusions in fiber drawn from the preform. The outer region 360, the first and second regions 338 and 342 and the tubes or rods 364 can comprise substantially similar material, such as, for example, silica glass.

The outer perimeter 328 of the preform 300 can comprise a diameter, indicated by arrows 393, that intersects the first and second cores, 322 and 324, and that is substantially perpendicular to one or both of the substantially straight lengths 348 and 358. The first and second regions, 338 and 342, such as when arranged in the preform 300, can comprise the diameter indicated by reference numerals 395. The diameter 395 can intersect the first and second cores, 322 and 324. The diameter 395 can be substantially perpendicular to one or both of the substantially straight lengths 348 and 358 and/or can be the maximum diameter that can be taken across the first and second regions 334 and 342. The diameter 395 can be coextensive with at least part of the diameter 393.

Figure 4:
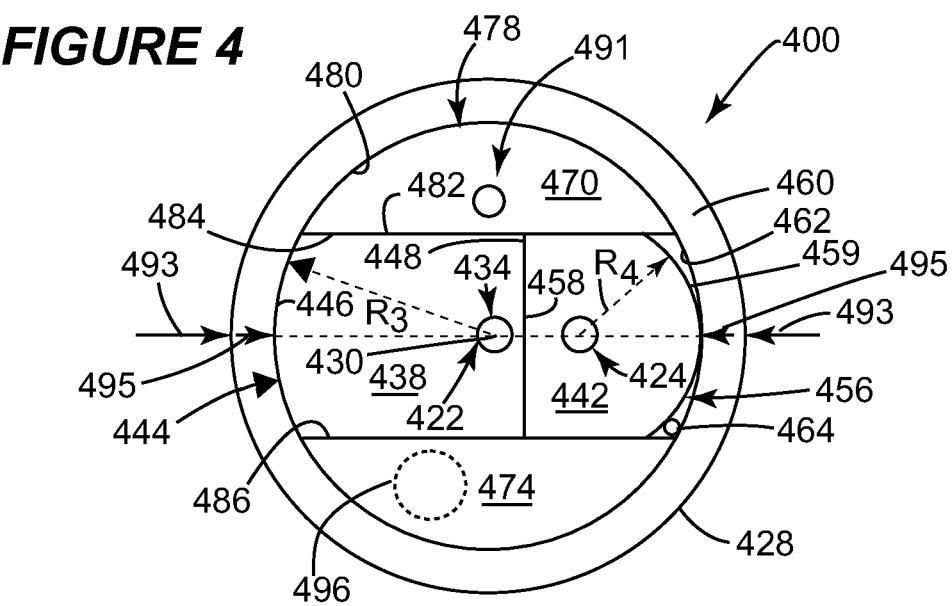
FIG. 4 is a cross section of another embodiment of an optical fiber preform.

FIG. 4 is a cross section of another embodiment of an optical fiber preform according to the invention, where the cross section is taken perpendicular to a longitudinal axis along which the preform extends. The optical fiber preform 400 comprises a first core 422 and a second core 424, and is in many respects similar to the preform 300 of FIG. 3. The first and second cores 422 and 424 can form, respectively, the first and centrally located core 122 and the side core 124 of the optical fiber 100.

The preform 400 can comprise an outer perimeter 428 bounding the cross section of the optical fiber preform 400 and defining the geometrical center of the preform 400. The first core 422 comprises a cross sectional area (defined by the outer perimeter 434 of the first core 422) within which the geometrical center 430 lies.

The preform 400 can also comprise first and second regions, 438 and 442, respectively. The first region 438 can include an outer perimeter 444 having a first curved length 446 and a first substantially straight length 448. The second region 442 can have an outer perimeter 456 having a second substantially straight length 458 facing the first substantially straight length 448. The first substantially straight length 448 can be substantially parallel to the second substantially straight length 458. The first substantially straight length 448 can be spaced from the second substantially straight length 458. In the embodiment shown in FIG. 4, the substantially straight lengths are substantially parallel and the second substantially straight length 458 is shown as coextensive with at least part of the first substantially straight length 448. The first substantially straight length 448 and the second substantially straight length 458 are contiguous in the embodiment shown in FIG. 4.

The preform 400 can include a second core 424 spaced from the first core 422. One of the first and second regions 438 and 442 can comprise the second core 424. In the embodiment shown in FIG. 4, the second region 442 comprises the second core 424. The preform, including the first and second cores 422 and 424, can be constructed and arranged such that the preform 400 can be drawn with rotation to a fiber, such as the fiber 100 of FIG. 1, wherein the central core 122 is multimode at a selected wavelength of operation and the side core 124 is wound about and spaced from the central core 122 and has a selected longitudinal pitch P and such that at the wavelength of operation the side core 124 couples to a higher order mode of the central core 122 and selectively increases the attenuation thereof relative to the fundamental mode of the central core 122.

The first curved length 446 of the first region 438 can be characterized by (i.e., substantially conform to) a first radius of curvature $R_3$. The second curved length 459 of the second region 442 can be characterized by a radius $R_4$. $R_3$ and $R_4$ are typically different, that is, they can originate from different locations and/or can have different lengths. In the embodiment shown, the radius $R_3$ originates from within the cross sectional area of the first core, the radius $R_4$ originates from within the cross sectional area of the second core, and the radius $R_3$ has a longer length than the radius $R_4$. In certain instances it may be possible for $R_3$ and $R_4$ to be substantially the same.

The preform 400 can include an outer region 460, which can be the cross section of a tube, disposed about the first region 438 and the second region 442. The region 460 can comprise the inner perimeter 462 and the outer perimeter of the region 460 can be the outer perimeter 428 of the preform. The inner perimeter can be contiguous with at least part of one or both of the curved lengths 446 and 459. The outer region 460 (as well as the first and second regions, except typically for the cores thereof) can comprise, consist essentially of, or consist of, for example, glass, such as silica glass. As noted above in the discussion of FIG. 3, the outer region can be formed, at least in part, by a vapor deposition process such as, for example, the Outside Vapor Deposition process. The preform 400 can comprise glass tubes or rods, the cross sections of selected ones of which are designated by reference numeral 464. The tubes or rods can be sized (e.g., have diameter selected) to fill the gaps between the inner perimeter 462 of the tube 460 and the curved length 459 of the perimeter 456 of the second region 442 to help prevent inclusions or voids in fiber drawn from the preform. The outer region 460, the first and second regions 438 and 442 and the tubes or rods 464 can all be comprised of, consist essentially of, or consist of substantially similar material, such as, for example, silica glass.

The preform 400 can include third and fourth regions, 470 and 474, respectively. The fourth region 474 can be substantially similar to the third region 470. One or both of the third and fourth regions can have a D-shaped cross section. The third region 470 can include an outer perimeter 478 having a curved length 480 and a substantially straight length 482. The outer perimeter 444 of the first region 438 can include another substantially straight length 484 that is substantially parallel to the substantially straight length 482. In the embodiment of the preform 400 shown in FIG. 4, the substantially straight lengths 482 and 484 are depicted as coextensive, though one of ordinary skill in the art, cognizant of the disclosure herein, understands that the substantially straight lengths 482 and 484 can be spaced from each other. As compared with the embodiment shown in FIG. 3, the embodiment shown in FIG. 4 can use fewer tubes or rods 464 (if any at all) to fill any gaps between the inner perimeter 462 of the outer region 460 and the outer perimeter 456 of the second region 442.

The outer perimeter 428 of the preform 400 can comprise a diameter, indicated by arrows 493, that intersects the first and second cores, 422 and 424, and that is substantially perpendicular to one or both of the substantially straight lengths 448 and 458. The first and second regions, 438 and 442, such as when arranged in the preform 400, can comprise the diameter indicated by reference numerals 495. The diameter 495 can intersect the first and second cores, 422 and 424. The diameter 495 can be substantially perpendicular to one or both of the substantially straight lengths 448 and 458 and/or can be the maximum diameter that can be taken across the first and second regions 438 and 442. The diameter 495 can be coextensive with at least part of the diameter 493.

In the embodiments shown in FIGS. 3 and 4, the outer regions 360 and 460, which can be the cross sections of commercially available substrate tubes, surround the regions (e.g., the first, second, third and fourth region and the regions 364 and 464 corresponding to rods or tubes) so as to hold them together. However, one or more of the regions shown in FIGS. 3 and 4 as surrounded by the outer region can be fused to each other such that the outer region need not be included. The outer perimeter of the preform is thus made up of the appropriate lengths of the boundaries of the various regions. Typically it is desirable that the outer perimeter be substantially circular. If the preform is to be rotated during draw, it can be advantageous to balance the preform about the longitudinal axis so as to avoid undue vibration during draw.

In one practice of the invention, the outer region can be included, as shown in FIGS. 3 and 4, and the first and second regions fused together, including fusing to the outer region via, for example, heating.

Though not explicitly indicated by reference numbers in FIG. 4, the outer perimeter of the second region 442 can include at least one substantially straight length that is substantially parallel to the straight length 482 of the outer perimeter 478 of the third region 470. In the embodiment of the preform 400 shown in FIG. 4, the outer perimeter of the second region 442 also includes a substantially straight length that is substantially parallel to a substantially straight length of the fourth region 474.

One of ordinary skill in the art, aware of the disclosure herein, understands that a preform according to the invention can include additional regions. For example, the first region 438 could comprise two regions with a vertical boundary between them, located, for example, to the left of the first core 422. In such an embodiment the region including the first core 422 would include a perimeter having only substantially straight lengths. Such considerations apply equally to the second region 442.

Furthermore, a preform according to the disclosure can include one or more stress-inducing regions for providing an optical fiber drawn from the preform with a selected birefringence. For example, a fiber having sufficient birefringence can better maintain, for a certain input polarization, the polarization state of the light as it propagates along a length of the fiber, such that the polarization state of the light exiting the other end of the fiber is identical to or more closely resembles the input polarization state. Such a fiber is often referred to as a "polarization maintaining" or "PM" fiber. A stress-inducing region creates a non-uniform stress field in the fiber for inducing birefringence via the stress-optic effect. One type of stress-inducing region comprises material having a different coefficient of thermal expansion than the material of the preform (or resultant drawn fiber) that is disposed about the stress-inducing region. Differences in dimensional changes during the drawing process (which involves heating, softening and flow of preform constituents and subsequent solidification) causes permanent stresses to be induced in the resultant drawn fiber and hence birefringence. With reference to FIGS. 3 and 4, the preform 300 can include stress-inducing region 396 and the preform 400 can include stress-inducing region 496.

Although preforms 300 and 400 are illustrated in FIGS. 3 and 4, respectively, as each including one stress-inducing region, one of ordinary skill in the art, apprised of the present disclosure, will appreciate that a preform according to the disclosure can include a plurality of stress-inducing regions, such as, for example, a pair of stress-inducing regions. For example, with reference to FIG. 3, the pair of stress-inducing regions could be diametrically opposed about the first core 330. In this instance one of the pair of stress-inducing regions would be located within the second region 342. FIGS. 3 and 4 are exemplary, and the stress-inducing region or regions can be located in any region or regions of the preform. The location and arrangement of the stress-inducing region or regions is typically determined, at least in part, by the amount of birefringence desired in the optical fiber drawn from the preform, and, as is known in the art, the amount of birefringence can be a function of at least the distance of the stress-inducing regions from the core, the size and shape of the stress-inducing region, as well as the difference between the coefficient of thermal expansion of the stress-inducing region and the material between the stress-inducing region and the core.

FIGS. 5A-5E schematically illustrate steps that can be employed in fabricating one or both of the preforms of FIGS. 3 and 4. Each of FIGS. 5A through 5E is a cross sectional view, taken along a longitudinal axis, of an elongate member that can be used to form a preform to draw an optical fiber having first and side cores. In one sense, each member can be considered a preform as it could be drawn to form an optical fiber, though the resultant fiber would have just a single, centrally located core.

Figure 5A:
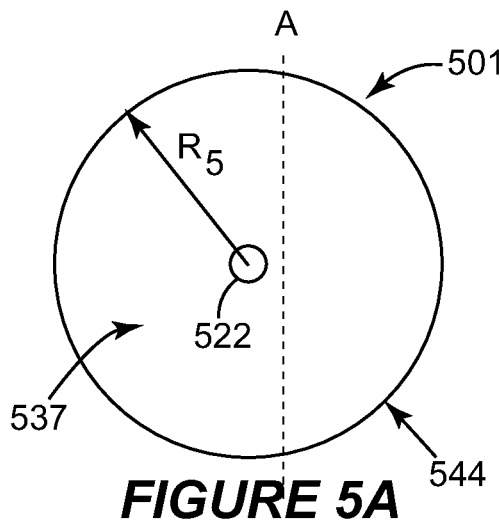
FIGS. 5A-5E schematically illustrates steps that can be employed in fabricating one or both of the preforms of FIGS. 3 and 4.
Figure 5B:
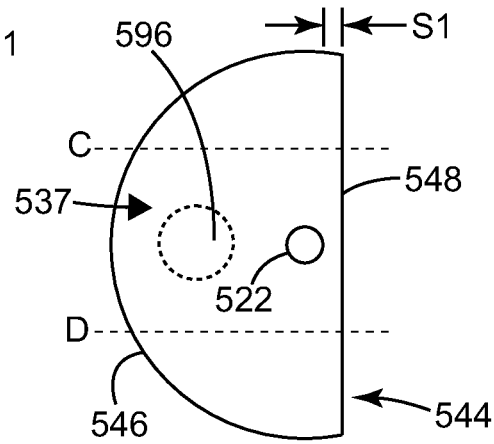

FIG. 5A shows an elongate member 501 that includes a core 522 and a cladding 537 disposed about the core 522. The elongate member 501 can include an outer perimeter 544 that substantially conforms to a circle having the radius $R_5$. The elongate member 501 can be shaped, such as by being machined (e.g., grinding) to remove material to the right of the dotted line A in FIG. 5A, such that the outer perimeter 544 of the elongate member 501 includes the curved length 546 and the substantially straight length 548, as shown in FIG. 5B. The core 522 remains within the outer perimeter 544, and the edge of the core is shown as being spaced from the substantially straight length 548 by the distance S1.

Figure 5C:
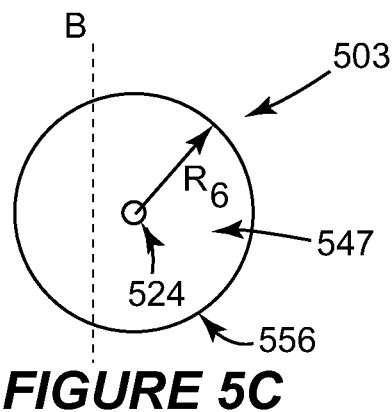
Figure 5D:
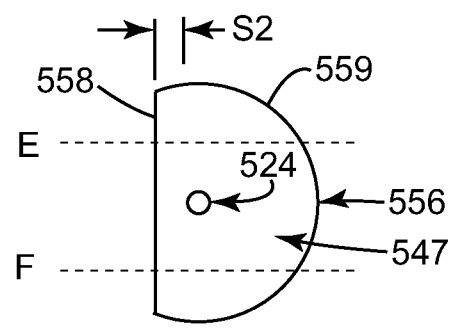

FIG. 5C shows a second elongate member 503 that includes a core 524 and a cladding 547 disposed about the core 524. The second elongate member 503 can include an outer perimeter 556 that can substantially conform to a circle having the radius $R_6$. One of the radii $R_5$ and $R_6$ is typically different than the other of the radii, such as by being smaller or larger. In the embodiment shown in FIG. 5E, the radius $R_6$ is smaller than the radius $R_5$. The elongate member 503 can be shaped, such as by being machined (e.g., grinding) to remove material to the left of the dotted line B in FIG. 5C, such that the outer perimeter 556 of the elongate member 503 includes the curved length 559 and the substantially straight length 558, as shown in FIG. 5D. The core 524 remains within the outer perimeter 556, and the edge of the core is shown as being spaced from the substantially straight length 558 by the distance S2.

Figure 5E:
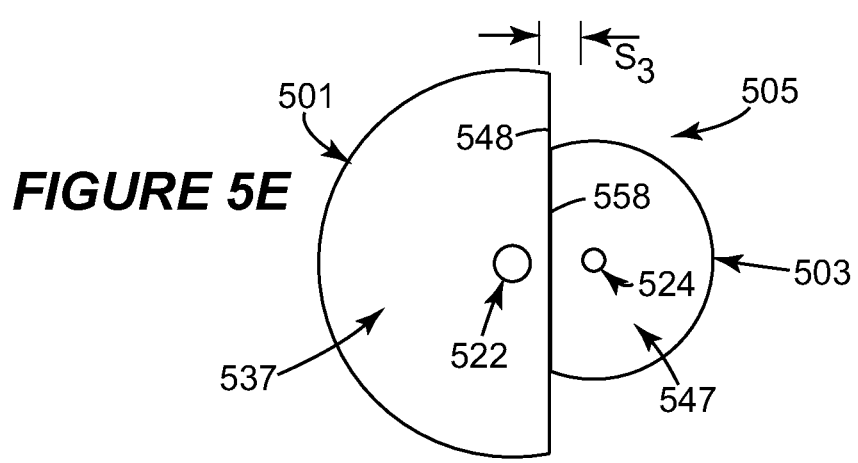

The first elongate member 501 and the second elongate member 503 can be arranged as illustrated in FIG. 5E, such that the substantially straight length 548 of the first elongate member 501 faces the substantially straight length 558 of the second elongate member 503. The substantially straight length 548 can be substantially parallel to the substantially straight length 558. The substantially straight length 548 can be spaced from the substantially straight length 558. In the embodiment shown in FIG. 5E, the substantially straight length 548 is substantially parallel to and contiguous with the substantially straight length 558. The substantially straight length 558 is shown as coextensive with part of the substantially straight length 548 in FIG. 5E. The arrangement shown in FIG. 5E can be disposed within an outer region, such as the tube 360 of FIG. 3, along with rods or tubes to fill gaps as desired, to form the preform 300 having the cross section shown in FIG. 3. One way to arrange the elongate members 501 and 503 as shown in FIG. 5E is to fuse the elongate member 501 to the elongate member 503.

The various regions of a preform according to the invention can be cross sections of various elongate members. According to one practice of the invention, it can be advantageous in certain instances to fuse some or all of the members together prior to drawing an optical fiber from the preform. However, such fusing is not considered necessary. For example, members can simply be arranged in proximity to each other within a tubular outer member (e.g., the member having the cross section 360 in FIG. 3) as shown in FIGS. 3 and 4. The term "preform," as used herein, is not limited to the particular, final structure from which a particular fiber is drawn. For example, in the instance where all of the regions or members are fused, the unfused arrangement is also considered a preform. An outer region can be disposed about the arrangement 505 using an Outside Vapor Deposition process, as noted above.

To form the preform 400 illustrated in FIG. 4, elongate members 501 and 503 can be shaped such that material above the dotted line C and below the dotted line D in FIG. 5B is removed from elongate member 501 and material above the dotted line E and below the dotted line F in FIG. 5D is removed from elongate member 503. The outer perimeter of each of the elongate members 501 and 503 now includes two additional substantially straight lengths, with, in the case of the elongate member 501, the two additional straight lengths each being substantially parallel to each other and hence substantially perpendicular to the substantially straight length 548. In the case of the elongate member 503, each of the two additional substantially straight lengths is substantially parallel to each other and substantially perpendicular to the substantially straight length 558. As appreciated by one of ordinary skill in the art, in light of the disclosure herein, the elongate members can be arranged with additional D shaped elongate members (which form the regions 470 and 474) and disposed within a suitable tubular outer region 460 to form the preform 400 shown in FIG. 4. Tubes or rods 464 can be included as appropriate, and may not be needed at all in certain practices of the invention.

Elongate members suitable to provide D-shaped regions 470 and 474 can be formed from circular elongate members that are shaped to remove material and provide the outer perimeters of the regions with appropriate substantially straight lengths (e.g., the substantially straight lengths 482 and 486 shown in FIG. 4. The additional elongate members can be drilled to form a hole to accommodate additional side cores, such as, for example, the side core 491 shown in FIG. 4. For example, the '008 published application teaches that additional side cores can be used.

Returning briefly to FIG. 5B, a stress-inducing region 596 can be added to the preform 300 or 400, by, for example, forming a hole (e.g., ultrasonically drilling a hole) in the first elongate member 501 and inserting a suitable stress inducing elongate member (e.g., a stress rod, such as borosilicate stress rod) into the hole. The hole can be formed and/or the rod inserted, at any appropriate step in the process of fabricating the preform. For example the hole can be drilled prior to removing material to the right of dotted line "A," the stress rod inserted and the first elongate member 501 collapsed about the elongate stress member, and the material to right of dotted line "A" then removed. Or, instead, the hole can be formed prior to material removal, material then removed, and the stress rod inserted into the hole subsequent to material removal. If the first and second elongate members 501 and 503, respectively, are fused together, the hole and/or the stress rod can be inserted after the fusing. It may not be necessary to collapse the elongate member 501 about the elongate stress member prior to drawing a fiber from the preform, though this can have certain advantages (e.g., preventing the elongate stress member from falling out of the hole). If desired, fusing and collapse can be avoided to various extents, and all or part of the preform assembled as inter fitting parts and drawn to a fiber directly from the assembled preform, as is discussed above. Some expedient should be taken to keep the stress rod in the hole, such as, for example, adding a cap to the bottom of the preform or refraining from drilling the hole all the way through the longitudinal extent of the preform or preform member.

Basic information regarding the formation of stress-inducing elongate members (e.g., stress rods) is known in the art. For example, a modified chemical vapor deposition (MCVD) process can be used to deposit silica-based glass inside a silica or doped silica (e.g., fluorine down doped) substrate tube. The deposited silica glass can include a selected dopant for increasing or decreasing, as appropriate, the coefficient of thermal expansion of the deposited silica glass. Known suitable dopants include boron and phosphorus. After deposition of a sufficient amount of doped silica, the tube is then collapsed to form a substantially solid stress rod. At this point the tube includes a region (e.g., that part of the rod that is formed by the tube) that is typically free of the dopant included in the deposited glass. A typical stress rod can include, for example an inner region having, for example, a diameter of from about 9 to about 12 mm, with an outermost diameter of, for example, about 15 mm (the region in between typically corresponds to the region formed by the tube). It can be advantageous to remove most or all of the tube-derived region such that the stress rod is substantially free of an outermost region that is free of the selected dopant. This can allow for higher birefringence in the fiber drawn from the preform, as doped deposited silica having the different thermal coefficient of thermal expansion (due to the selected dopant alone or in combination with other dopants) will be closer to the core of the drawn fiber. Also, removal of most or all of the region corresponding to the tube can be advantageous where the substrate tube is pre-doped with fluorine, as the removal can help avoid formation of undesired light-guiding regions in the resultant drawn fiber.

It can be advantageous to initially form the hole so as to have an internal diameter that is less than the desired final diameter and to increase the diameter from the smaller diameter to the final diameter by, for example, one or both of honing and etching. For example, an etchant solution (e.g., hydrofluoric acid) can be pumped through the hole to etch away the walls and increase the diameter. In fact, generally speaking, etching or honing to a final dimension from an initially machined dimension that is slightly different that the final dimension can be a useful technique that can be applied in other circumstances as well. For example, rather than grinding away all of the material to the right of the dotted line A in FIG. 5A, most can be removed by grinding and then the final desired dimension (i.e., shaping such that all of the material to the right of the dotted line A is removed) achieved by etching. Accuracy can be improved, as etching gives finer control of the material removal process.

It is understood that one of ordinary skill in the art is aware of the teachings of the '008 patent publication and other publications pertaining to fibers having side cores, as well as the art of preform manufacture, wherein dimensions of a preform and draw parameters are selected so as to fabricate a fiber having selected core and cladding dimensions so as to provide for a desired optical behavior. Accordingly, details of the foregoing are not repeated here.

According to the present invention, the primary and side cores of preforms, such as the preforms noted above in FIGS. 3, 4 and 6 (and FIGS. 8 and 12 below) can be constructed and arranged such that the preform can be drawn with rotation to a fiber wherein the first core is multimode at a selected wavelength of operation and the second core is spaced from and winds around the first core so as to have a selected longitudinal pitch and such that at said wavelength of operation said side core couples to a higher order mode of the first core and selectively increases the attenuation thereof relative to the fundamental mode of the first core.

Figure 2:
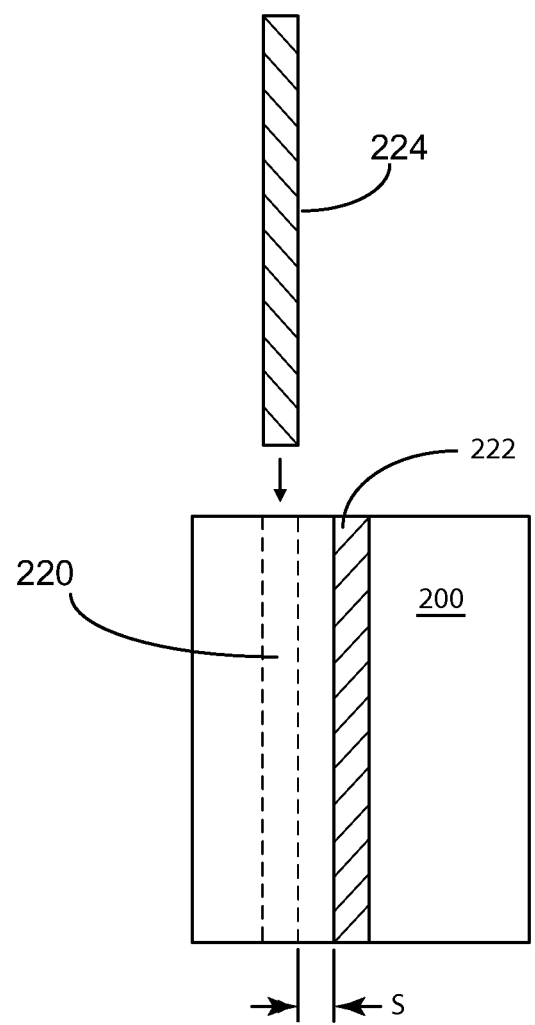
FIG. 2 schematically illustrates a prior art method of making a preform from which the fiber of FIG. 1 can be drawn.

The spacing S3 indicated in FIG. 5E is substantially equal to the sum of S1 and S2. Applicants consider that, for a spacing between the first and the side cores of less than a certain value, it is safer, in terms of the likelihood of damage to the preform, to shape the preform as shown in FIGS. 5A-5E to achieve the spacing S3 than it is to drill a hole next to the core 222 so as to achieve a spacing S (shown in FIG. 2) that is substantially the same as S3.

Note that, regarding one or both of the elongate members 501 and 503, prior to shaping the members to remove material to the side of the lines A and B, the geometrical center defined by the outer perimeter of the member lies within the cross section area of a core of the member (e.g., within the cross section area of the core 522 or 524, where the cross sectional area core is that area within the outer perimeter of the core). This is typically because the initial forming of the member including a core is by a substantially axially symmetric process. The core is typically located substantially at the center of the elongate member (other cores, such as, for example, additional side cores, could be added to the member, such as by drilling a hole and inserting a core rod into the hole). After removal of the material to the right of dotted line A (in the case of elongate member 501) or to the left of dotted line B (in the case of elongate member 503), the geometric center of the member as now defined by the outside perimeter of the member typically is no longer located within the cross sectional area of the core.

The elongate members 501 and 503 are each typically made of glass, such as, for example, silica glass. The claddings 537 and 547 can each consist essentially of, or consist of undoped silica glass. The elongate members can be formed by a variety of general preform fabrication processes known in the art of fiber optic preparation, including, but not limited to, MCVD, OVD, VAD, and the like.

Figure 6A:
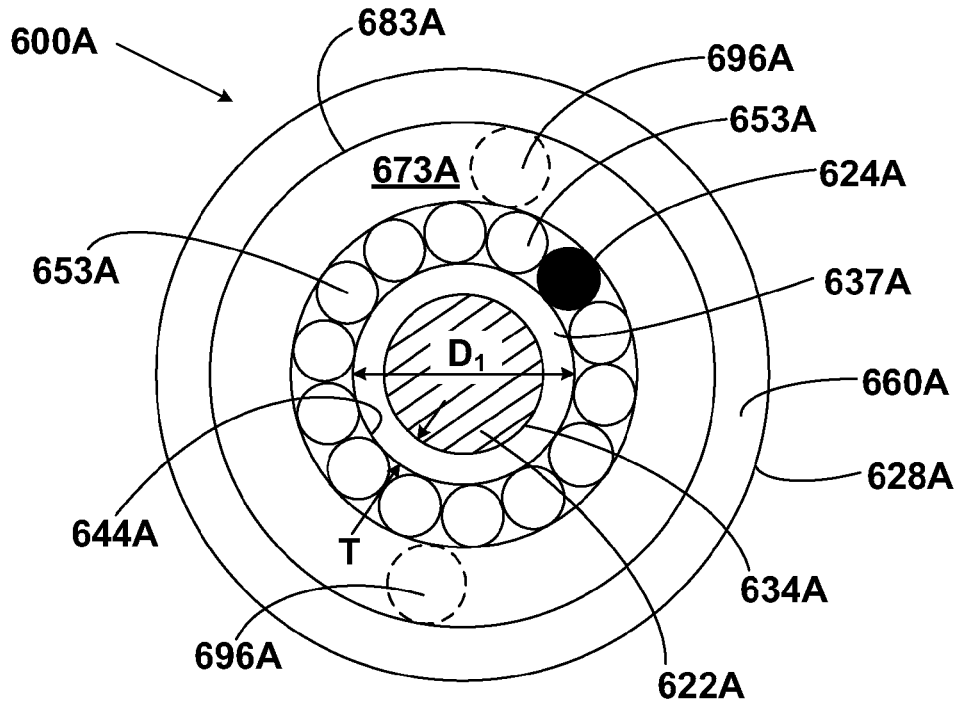
FIG. 6A is a cross section of yet a further embodiment of an optical fiber preform.
Figure 6B:
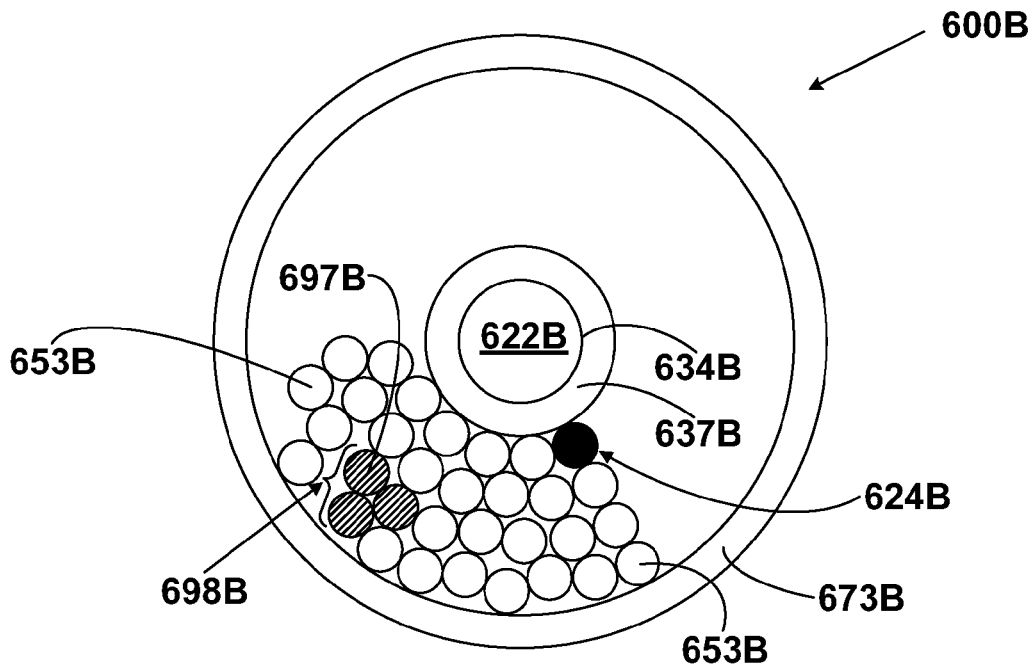
FIG. 6B is cross section of yet an additional embodiment of an optical fiber preform.

FIGS. 6A and 6B are cross sections of yet further embodiments of an optical fiber preform according to the present invention. With reference to FIG. 6A, the optical fiber preform 600A comprises a first core 622A and a side core 624A. The first core comprises an outer perimeter 634A. The preform 600A comprises an outer perimeter 628A bounding the cross section of the optical fiber preform 600A and defining the geometrical center of the preform. The geometrical center can lie within the cross sectional area of the first core 622A, which is the area within the outer perimeter 634A of the first core 622A. The cladding 637A can be disposed about the core 622A and can have an annular shape, as shown in FIG. 6A. The first core 622A and cladding 637A can be part of a core rod having as its outer perimeter the outer perimeter 644A of the cladding 637A. The core rod can be unitary, that is, the first core 622A can adheringly contact the cladding 637A. One way to form such a unitary core rod is to deposit core material on the inside of a tube, such as by using the aforementioned MCVD technique, where at least part of the tube can form at least part of the cladding. The tube can be etched or machined to have its outside diameter reduced, if necessary, to provide a core rod having a selected outside diameter. Typically, the cladding 637A will form a rather thin layer around the first core 622A of the unitary core rod. In various practices of the invention, the thickness T of the cladding is no greater than 15% of the diameter $D_1$ of the first core 622A, no greater than 10% of the diameter $D_1$, or no greater than 8% of the diameter $D_1$. The first core 622A and the cladding 637A of the core rod can be substantially solid, that is, substantially free of longitudinally extending voids, such as would be the case, for example, for the cladding 637A if it were formed by packing rods or tubes together (such as is often done in forming a preform for photonic bandgap or microstructured cladding fiber).

An annular arrangement of elongate members 653A, which are typically circular (e.g., tubes or rods), is disposed about the core 622A and cladding 637A, along with the side core 624A, which can be a tube or rod, typically including a material that is different than a material included by one or more of the tubes or rods 653A. The preform 600A can include a first annular region 673A, having the outer perimeter 683A, disposed about the annular arrangement of elongate members 653A, and a second annular region 660A, having the outer perimeter 628A, disposed about the first annular region 673A. The annular regions can be cross sections of first and second substrate tubes, respectively, as is appreciated by one of ordinary skill in the art, in light of the disclosure herein. If available, a single tube having the appropriate thickness can be used instead of two tubes. As noted above in conjunction with the discussion of FIGS. 3, 4 and 5A-5E, all or selected parts of the preform 600A can be fused prior to drawing optical fiber from the preform.

The preform 600A can include one or more stress-inducing regions, such as the two regions 696A shown in FIG. 6A, which, in the embodiment shown in FIG. 6A, are arranged diametrically about the core 622A. The stress-inducing regions can be formed as note above, that is, by drilling holes and inserting appropriate stress rods. The holes can be drilled after fusing some or all of the parts of preform 600A together (if it is desired to fuse the parts) or, by way of another example, can be drilled on the tube that forms annular region 673A prior to incorporating the tube into the preform 600A. Stress rods can be inserted in holes at various steps in the process of forming the preform.

With reference to FIG. 6B, the optical fiber preform 600B comprises a first core 622B and a side core 624B. The first core comprises an outer perimeter 634B. The preform 600B comprises an outer perimeter bounding the cross section of the optical fiber preform 600B and defining the geometrical center of the preform. The geometrical center can lie within the cross sectional area of the first core 622B, which is the area within the outer perimeter 634B of the first core 622B. The cladding 637B can be disposed about the core 622B and can have an annular shape, as shown in FIG. 6B. The first core 622B and cladding 637B can be part of a core rod having as its outer perimeter the outer perimeter of the cladding 637B. The core rod can be unitary, that is, the first core 622B can adheringly contact the cladding 637B. The first core 622B and the cladding 637B of the core rod can be substantially solid, that is, substantially free of longitudinally extending voids, such as would be the case, for example, for the cladding 637B if it were formed by packing rods or tubes together (such as is often done in forming a preform for photonic bandgap or microstructured cladding fiber).

An annular array of elongate members 653B, which are typically circular (e.g., tubes or, more preferably, substantially solid rods), can be disposed about the core 622B and cladding 637B, along with the side core 624B, which can be a tube or rod, typically including a material that is different than a material included by one or more of the tubes or rods 653B. The tubes or rod 653B can, as one of ordinary skill having read this disclosure will readily understand, form part of the cladding of the fiber drawn from the preform. The preform 600B can include a first annular region 673B, having an outer perimeter, disposed about the annular arrangement of elongate members 653B. All or selected parts of the preform 600B can be fused prior to drawing optical fiber from the preform. For brevity, not all features of the preform 600B are described in detail, as they are similar to those described above for the preform 600A of FIG. 6A, as one of ordinary skill, cognizant of the disclosure herein, will appreciate.

Note the preform 600B can include one or more stress-inducing regions, which have been described above. A stress-inducing region or regions can be formed from an elongate stress-inducing member 697B included in the preform, as shown in FIG. 6B. A plurality of stress-inducing members 697B can be arranged as indicated by reference number 698B so as to form a stress-inducing region in the fiber drawn from the preform. An elongate stress-inducing member can comprise, for example, a borosilicate stress rod. Phosphosiliate stress rods, as well as stress rods that include both boron and phosphorus are also known in the art, as are other constituents for an appropriate elongate stress member.

As noted above, general preform fabrication methods and drawing a fiber from a preform using a draw tower having a furnace for heating one end of the preform are well known in the art, and, accordingly, are not discussed in a lot of detail herein.

Figure 7:
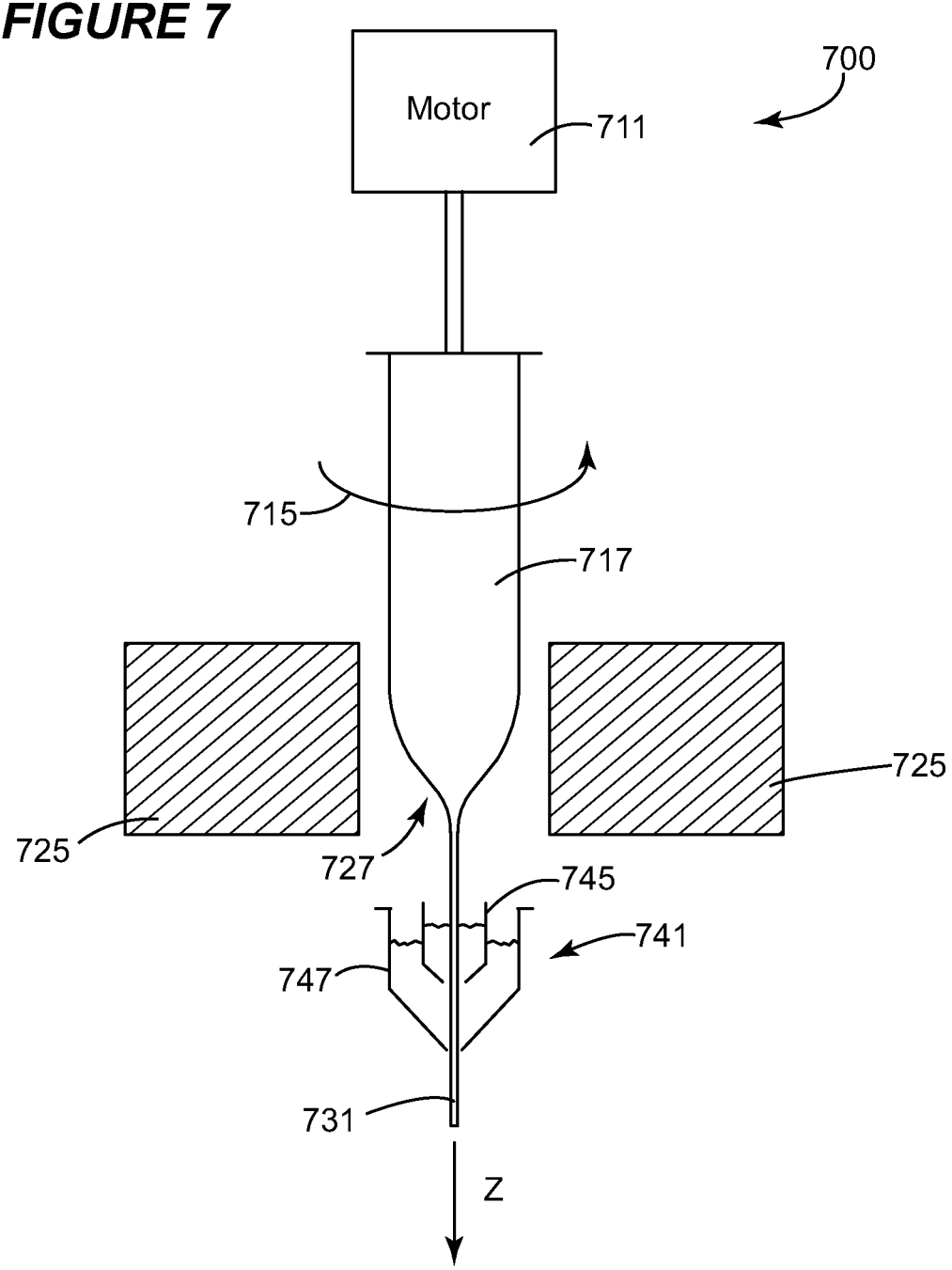
FIG. 7 schematically illustrates drawing an optical fiber from a preform while rotating the preform.

A preform according to the invention can be drawn to a fiber while rotating one or both of the fiber and the preform. Preferably, only the preform is rotated. FIG. 7 schematically illustrates drawing an optical fiber from a preform while rotating the preform. The motor 711 rotates, as indicated by reference numeral 715, the preform 717. The furnace 725 heats the end 727 of the preform 717 to facilitate drawing of the fiber 731. The coating apparatus 741 can add a coating to the fiber that can serve to protect the fiber as well as a cladding, depending, as is known in the art, on the characteristics of the cladding (e.g., the refractive index of the cured cladding relative to the refractive index of the region of the optical fiber to which the coating is applied. The coating apparatus 741 shown in FIG. 7 includes nested reservoirs 745 and 747 for applying a dual coating to the optical fiber 731. As is known in the art, the inner coating reservoir can apply a soft coating and the outer coating reservoir can apply a hard coating over the soft coating. A UV lamp (not shown) typically cures the coatings before the fiber 731 is wound on a spool. In some practices of the invention the coating has a lower index to confine pump light to the region of the fiber surrounded by the cured coating. Such fibers are known in art as "cladding pumped" or "double clad" fibers. It can be advantageous for the region of the fiber surrounded by the coating to have a non-circular outer perimeter. For example, the outer region 360 of FIG. 3 or the outer region 460 of FIG. 4 can be shaped, such a by grinding, to have a non-circular perimeter (e.g., a flat can be ground into the outer perimeter 328 of outer region 360 to provide the desired non-circularity).

It can be desirable to apply a vacuum to a preform, such as, for example, to the region of the preform 300 of FIG. 3 inside of the inner perimeter 362 of the outer region 360, while drawing the preform to a fiber, as is know in the art.

A preform can be made using one or more of a variety of suitable methods, including vapor phase methods such as outside vapor deposition (OVD), Modified Chemical Vapor Deposition (MCVD), Chemical Vapor Deposition (CVD) and Vapor Axial Deposition (VAD) and combinations thereof. Vapor phase methods usually employ suitable gas precursors that are introduced to a hot substrate, a hot zone, or directly into a flame. The latter technique is known as flame hydrolysis. In the flame hydrolysis technique, precursor gases are introduced to a flame to form soot that is deposited on a substrate, such as the inside, outside or end of a tube or rod. The soot is subsequently heated and sintered using an oven or furnace. The tube or rod can form a part of the resultant optical fiber preform, or can be removed. The OVD and VAD processes typically involve flame hydrolysis. In other vapor phase techniques, such as CVD and MCVD, precursor gases are introduced to a hot zone and/or a heated substrate, which can again be a tube or rod. One supplier of MCVD lathes and of draw towers is Nextrom Technologies of Finland. Nextrom Technologies has a U.S. office located at 2150 Northmont Pkwy—suite F, Duluth, Ga. 30096.

Each of the foregoing techniques can include one or more overjacketing steps wherein a member formed by one of the foregoing techniques is overjacketed with a glass tube that will typically form additional cladding. Overjacketing can be used to add a region, such as the region 360 of FIG. 3, to a preform. Glass tubes are available in a variety of sizes, and are often specified by an inner and outer diameter. Tubes can be etched to adjust the outer and inner diameters as necessary to facilitate various desired glass working steps, as is know in the art. Glass tube and rods suitable for deposition of soot, the deposition of glass, or for use as an overjacket are available from Heraeus Amersil, Inc. 3473 Satellite Blvd., Duluth, Ga., 30096. The glass rods and/or tubes can include various types of glasses, such as, for example, silica glass, borosilicate glass, a fluorinated silica glass, a phosphate glass and other types of glasses.

Rods and tubes can also be made by casting molten glass into appropriate molds. For example, one technique for providing a tube is to cast molten glass into a mold that is spun on a lathe. Centrifugal force causes the molten glass to press outward against the walls of the mold such that the glass cools to form a tube. Rods and tubes can also be made by Sol-Gel techniques.

Most typically, silica is the host glass of the optical fiber or preform, to which other materials are added. Common dopant materials used with silica include aluminum, boron, fluorine, germanium, phosphorus, titanium, the rare earths (such as, for example, erbium, ytterbium and lanthanum) and transition metals, which can be used to provide selected attenuation. However, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, and the like, may be found suitable. By way of example, and not of limitation, an optical fiber according to the invention may comprise any of these or other materials, or variants thereof, singly or in combination for the core, cladding or other layers. Dopants can be added using, for example, vapor phase processes and/or solution doping processes.

Figure 8:
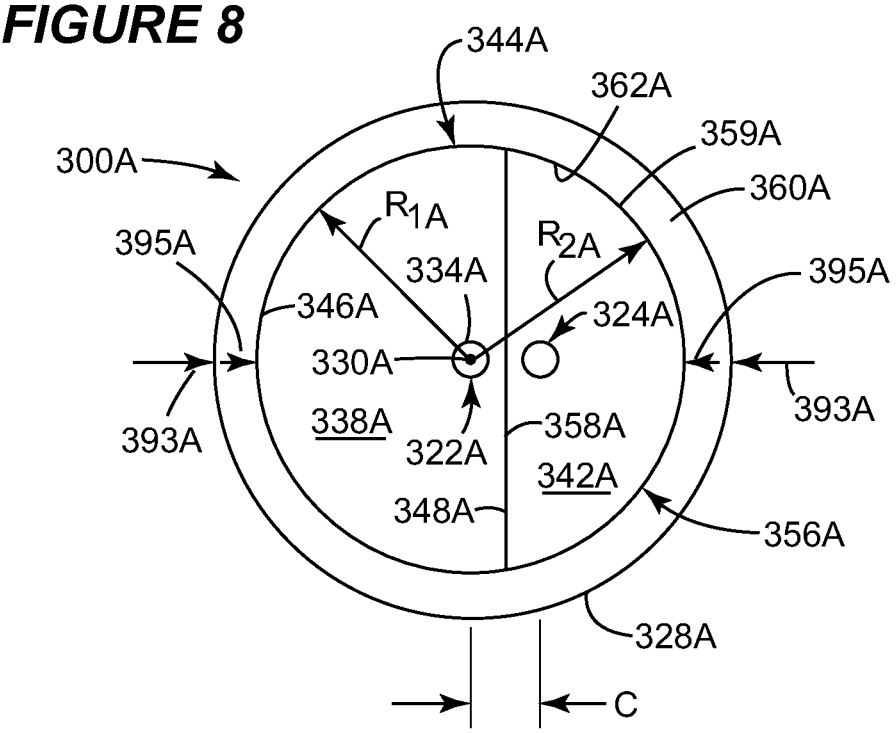
FIG. 8 schematically illustrates a cross section of another embodiment of an optical fiber preform.

FIG. 8 schematically illustrates in more detail an example of the preform 300 illustrated in FIG. 3. In most instances the reference numerals of FIG. 8 correspond to those used in conjunction with FIG. 3. To allow for separate discussion of the FIGURES without engendering confusion, the suffix "A" is added to the reference numerals of FIG. 8. To avoid undue repetition, however, a full description corresponding to each of the reference numerals of FIG. 8 is not repeated here, and for those not discussed here reference may be made to the discussion accompanying FIG. 3 and the reference numeral as used there without the suffix. Similar considerations apply to other FIGURES below, as will be readily appreciated by one of ordinary skill in the art.

In the embodiment shown in FIG. 8, the first region 338A can comprise an outer perimeter 344A having a first curved length 346A that is characterized by a radius of curvature $R_{1A}$ that is substantially the same as $R_{2A}$, where the outer perimeter 356A of the second region 342A includes a second curved length 359A that is characterized by the radius of curvature $R_{2A}$. That is, the radius of curvature $R_{1A}$ and the radius of curvature $R_{2A}$ can originate from the substantially the same location (e.g., the geometrical center of the outer perimeter 334A of the first core 322A) and have substantially the same length. The first and second curved lengths 346A and 359A can form substantially the entire outer perimeter of the first and second regions, which outer perimeter can be the outer perimeter 328A of the preform, as the substantially circular nature of the outer perimeter of the first and second regions can obviate the need to dispose the region 360A about the first and second regions. If the region 360A is disposed about the first and second regions 338A and 342A, there may be little or no need to include tubes or rods 364 shown in FIG. 3, as any gaps between the outer perimeters of the first and second regions and the inner perimeter of the outer region 362A can be considerably reduced in size (e.g., see the gap between the outer perimeter 356 of the second region 342 and the inner perimeter 362 of the outer region 360 as illustrated in FIG. 3). Though not shown in FIG. 8, the preform 300A can include one or more stress-inducing regions. Stress-inducing regions can be included with the preform 300A according to variety of techniques, such as, for example, according to one or more of the techniques relating to stress rods that are disclosed elsewhere herein.

Figure 9:
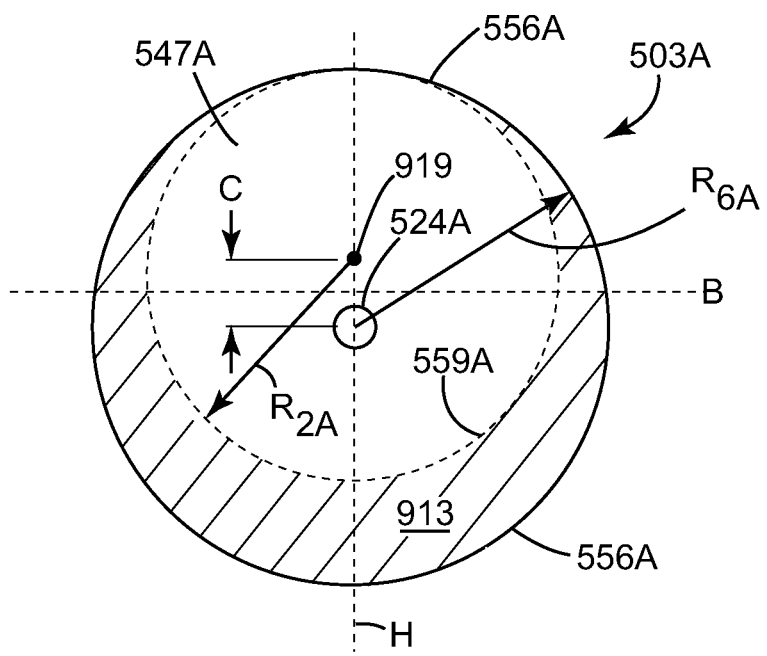
FIG. 9 schematically illustrates how an elongate member is to be modified to have a desired shape for use in forming one embodiment of a preform according to the invention.

The preform 300A can be fabricated generally according to the procedures shown in FIGS. 5A through 5E and the accompanying description thereof provided herein. However, the elongate member 503, which can form region 342A shown in FIG. 8, is shaped to have an outer perimeter having a curved section substantially characterized by the radius of curvature of $R_{2A}$. With reference to FIG. 9, the elongate member 503A includes a core 524A, a cladding 547A, and an outer perimeter 556A that substantially conforms to a circle having a radius $R_{6A}$, where $R_{6A}$ is longer than $R_{2A}$.

With reference to FIGS. 8 and 9, the distance C is the distance between the geometric centers of the outer perimeters of the typically circular cores 322A and 324A taken along a line through the centers (e.g., the line H in FIG. 9). With reference to FIG. 9, the material between the outer perimeter 556A and the dotted line 559A, namely the material of region 913 of FIG. 9, is removed. The dotted line 559A substantially conforms to a radius of curvature $R_{2A}$ where the radius originates at location 919 spaced along a diameter of the outer perimeter 556A by a distance C from the geometric center of the outer perimeter of the core 524A. Typically, the elongate member 503A is made from an axially symmetric process and has a circular core 524A, and hence the aforementioned geometric center is simply the center of the circular core. The material above the line B is then removed, such as by grinding or etching so as to form the second elongate member 503A shown in FIG. 10 having an outer perimeter 556A comprising the substantially straight length 558A and the curved length 556B that is characterized by the radius $R_{2A}$. The first elongate member 501 can be arranged with the second elongate member 503A such that the substantially straight lengths are contiguous and the entire outer perimeter thereof is characterized by a radius $R_{2A}$. The line B shown in FIG. 9 and the line A shown in FIG. 5A can be selected such that the edges of the cores of the elongate members are spaced by the appropriate distance (e.g., the distance S3 shown in FIG. 5E) when the first and second elongate members are arranged as shown to form the preform 300A. This distance is in turn selected to provide the desired spacing d (see FIG. 1) in the resultant fiber drawn from the preform with rotation, as illustrated schematically in FIG. 7.

Figure 10:
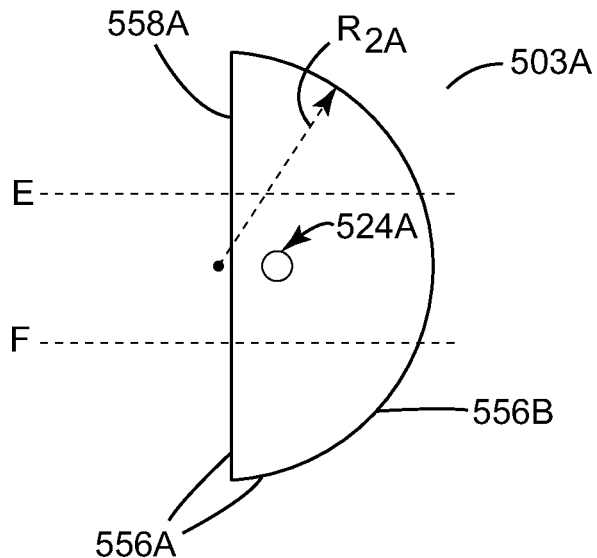
FIG. 10 schematically illustrates a cross section of an elongate member having the desired shape shown in FIG. 9.
Figure 11:
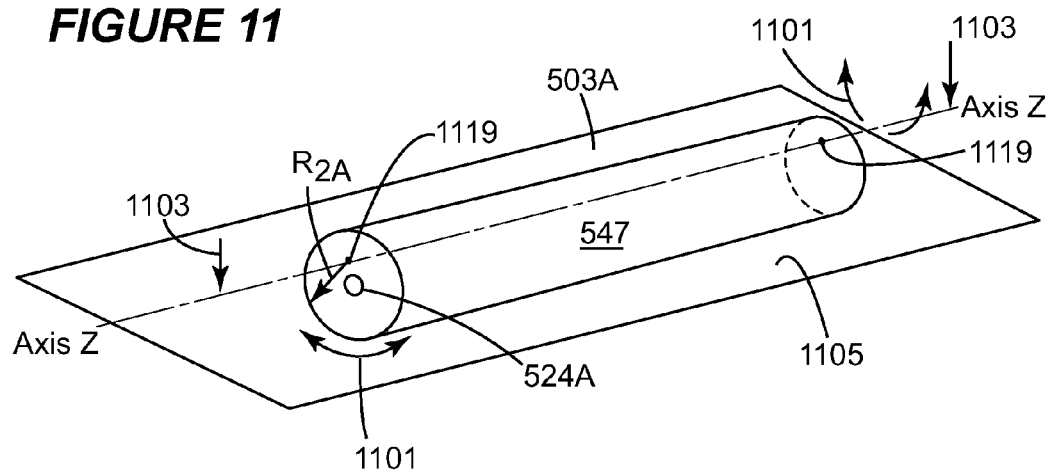
FIG. 11 schematically illustrates shaping the elongate member of FIG. 9 to change the shape of at least part of the outer perimeter thereof.

FIG. 11 illustrates one technique for removing the region 913 from the elongate member 503A of FIG. 9 so as to provide the curved length 556B shown in FIG. 10. The elongate member 503A is mounted on a polishing or grinding apparatus so as to pivot about the axis Z shown in FIG. 11. The axis Z can be moved downward, as indicated by arrow 1103, such that the elongate member 503A contacts the grinding or polishing surface 1105. Axis Z can be selected so as to pass through locations 1119, on each end face of the elongate member, corresponding to location 919 shown in FIG. 9. Arrows 1101 indicate the pivoting motion about the axis Z. The axis Z can be moved downward until it is spaced from the grinding or polishing surface by a distance substantially equal to $R_{2A}$. In one practice of the invention, reference numeral 1105 can represent the surface of an etchant bath.

Figure 12:
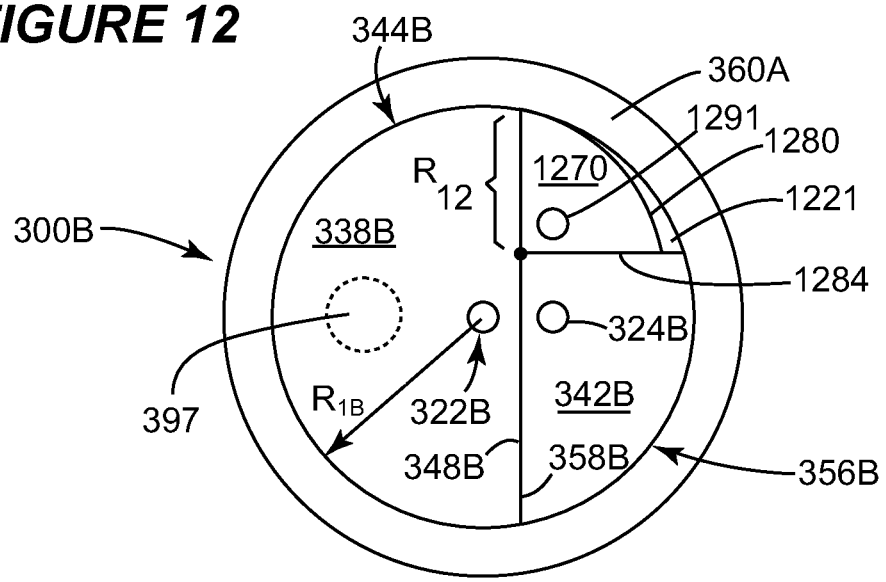
FIG. 12 schematically illustrates a cross section of yet an additional embodiment of an optical fiber preform.

FIG. 12 illustrates another example of a preform 300B according to the invention. With reference to FIG. 10, the material above line E can be removed from elongate member 503A so that elongate region 503A may form second region 342B of the preform 300B of FIG. 12. The second region 342B can comprise the outer perimeter 356B having a substantially straight length 1284 formed by the removal of the material above line E in FIG. 10. The preform 300B can comprise a third region 1270 comprising a third core 1291 that is spaced from the cores 322B and 324B. The spacings between the cores can be selected such that the resultant spacings between the corresponding cores of the fiber drawn from the preform can, as taught in the '008 application noted above, attenuate higher order modes in the fiber core formed from the core 322B of the preform 300B. The third region 1270 can be derived from an elongate member according to the teachings herein. The outer perimeter of the third region 1270 can comprise the curved length 1280, which can be characterized by a radius $R_{12}$ that has a shorter length than the radius $R_{1B}$, where the outer perimeters of the first and second regions each include curved lengths characterized by the radius $R_{1B}$. By proper selection of the foregoing radii, in certain circumstances the gap 1221 can remain small enough such that the preform 300B need not include rods or tubes to help fill the gap. In other circumstances such rods or tubes may help fill the gap. The preform 300B can include one or more stress-inducing regions, such as, for example, the stress-inducing region indicated by reference numeral 397. Stress-inducing regions can be included with the preform 300B according to variety of techniques, such as, for example, according to one or more of the techniques relating to stress rods that are disclosed elsewhere herein.

It is noted that in many instances the reference numerals of FIG. 12 correspond to those used in conjunction with FIG. 3. To allow for separate discussion of the FIGURES without engendering confusion, the suffix "B" is added to the reference numerals of FIG. 12. To avoid undue repetition, however, not all the reference numerals of FIG. 3 are provided with a corresponding reference numeral in FIG. 12 and not all those shown are discussed here. For those reference numerals not discussed here reference may be made to the discussion accompanying FIG. 3 and the reference numeral as used there without the suffix.

Several embodiments of the invention have been described and illustrated herein. Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used. It is therefore to be understood that the foregoing embodiments are presented by way of example only and that within the scope of the appended claims and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision 1.

The invention claimed is:

1. A method for making an optical fiber having a first core and a second core spaced from the first core, the method comprising:

(a) providing an optical fiber preform extending in a longitudinal direction, the optical fiber preform comprising:
   a first core;
   a second core spaced from the first core; and
   first and second regions, said first region when viewed in cross section having an outer perimeter having a first substantially straight length and the second region having an outer perimeter having a second substantially straight length facing said first substantially straight length, the first straight length and the second straight length being contiguous and substantially parallel;

one of said first and second regions comprising said first core and a cladding disposed about said first core and the other of said first and second regions comprising said second core and a cladding disposed about said second core;

said optical fiber preform being constructed and arranged such that the optical fiber preform can be drawn; and (b) drawing the optical fiber from the optical fiber preform while rotating the optical fiber preform about an axis passing through the first core to provide the optical fiber, wherein the optical fiber is configured such that the first core of the optical fiber is multimode at a selected wavelength of operation and the second core of the optical fiber is spaced apart from and winds around the first core of the optical fiber and has a selected longitudinal pitch, wherein at said wavelength of operation the second core of the optical fiber couples to a higher order mode of the first core of the optical fiber and increases the attenuation thereof relative to the fundamental mode of the first core of the optical fiber, and wherein the term "cross section" means cross section taken perpendicular to the longitudinal direction.

2. The method of claim 1 wherein said optical fiber preform comprises an outer perimeter bounding the cross section of the optical fiber preform and defining the geometrical center of the optical fiber preform and wherein said first core of said optical fiber preform comprises a cross sectional area within which the geometrical center lies.

3. The method of claim 1 wherein the outer perimeter of said first region includes a first curved length characterized by a first radius of curvature and the outer perimeter of said second region comprises a second curved length that is characterized by a second radius of curvature that is substantially the same as said first radius of curvature and wherein said first radius of curvature originates within the cross sectional area of said first core of said optical fiber preform and said second radius of curvature does not originate from within the cross sectional area of said second core of said optical fiber preform.

4. The method of claim 1 wherein the outer perimeter of said first region includes a first curved length characterized by a first radius of curvature and the outer perimeter of said second region comprises a second curved length that is characterized by a second radius of curvature that is different from said first radius of curvature and wherein said first radius of curvature originates within the cross sectional area of said first core of said optical fiber preform and said second radius of curvature originates from within the cross sectional area of said second core of said optical fiber preform.

5. The method of claim 1 wherein said first and second regions are fused together.

6. The method of claim 1 wherein the outer perimeter of said second region comprises only substantially straight lengths.

7. The method of claim 1 comprising a stress-inducing region for providing the optical fiber drawn from the optical fiber preform with a selected birefringence.

8. The method of claim 1, wherein the first region and the second region are disposed within an annular outer region.

9. The method of claim 8, wherein the annular outer region has an inner perimeter; the outer perimeter of said first region includes a first curved length characterized by a first radius of curvature; the outer perimeter of said second region comprises a second curved length that is characterized by a second radius of curvature that is substantially the same as said first radius of curvature; and wherein the first curved length of the outer perimeter of the first region and the second curved length of the outer perimeter of the second region are contiguous with the inner perimeter of the annular outer region.

10. The method of claim 8, wherein the optical fiber preform further comprises one or more glass tubes or rods disposed within the annular outer region.

11. The method of claim 1, wherein the optical fiber preform is fabricated by a method comprising;

providing a first elongate member having when viewed in cross section an outer perimeter having a first curved length and the first substantially straight length, the first elongate member further including, within the outer perimeter of the first elongate member, a core and a cladding disposed about the core of the first elongate member;

providing a second elongate member having when viewed in cross section an outer perimeter having the second substantially straight length and a curved length and a second core within the outer perimeter of the second elongate member; and arranging the optical fiber preform such that the first substantially straight length faces the second substantially straight length and the first and second substantially straight lengths are contiguous and substantially parallel;

wherein the term "cross section" means cross section taken perpendicular to the longitudinal direction.

12. The method of claim 11 wherein arranging the optical fiber preform comprises arranging the optical fiber preform such that the outer perimeter of the cross section of the optical fiber preform defines a geometrical center and the geometrical center lies within the cross sectional area of the first core of said optical fiber preform.

13. The method of claim 11 wherein said first curved length is characterized by a first radius of curvature and said second curved length is characterized by a second radius of curvature, the first and second radii of curvature being substantially the same and wherein said first radius of curvature extends from within the cross sectional area of said first core of said optical fiber preform and wherein said second radius of curvature does not extend from within the cross sectional area of said second core of said optical fiber preform.

14. The method of claim 11 wherein said first curved length is characterized by a first radius of curvature and said second curved length is characterized by a second radius of curvature, and wherein the first and second radii of curvature are different and said first radius of curvature extends from within the cross sectional area of said first core of said optical fiber preform and wherein said second radius of curvature extends from within the cross sectional area of said second core of said optical fiber preform.

15. The method of claim 11 wherein providing a selected one of the first and second members comprises providing the selected member having when viewed in cross section a substantially circular outer perimeter and shaping the member to form the first substantially straight length, wherein the substantially circular outer perimeter defines a geometrical center lying within the cross sectional area of a core of the member and wherein shaping comprises shaping such that the outer perimeter defines a new geometrical center that lies outside of the cross sectional area of the core of the member.

16. The method of claim 11 wherein providing first elongate member comprises an axially symmetric deposition process wherein material to form the first core of the first elongate member is deposited on a first cylindrical substrate and wherein providing the second elongate member comprises an axially symmetric deposition process wherein material for forming the second core of the second elongate member is deposited on a different cylindrical substrate.

17. The method of claim 11 comprising forming a hole in a region of the optical fiber preform and inserting a stress-inducing elongate member in the hole for increasing the birefringence of the optical fiber drawn from the optical fiber preform.

18. A method for making an optical fiber preform according to claim 11, wherein each of the first elongate member and the second elongate member is made by a method comprising providing an elongate member having substantially circular outer perimeter, the elongate member comprising a core and a cladding disposed about the core of the member;

machining the elongate member to form a substantially straight length.

* * * * *